United States Patent
Sorin et al.

(10) Patent No.: US 6,766,115 B1
(45) Date of Patent: Jul. 20, 2004

(54) MULTIPORT OPTICAL COMPONENT TESTING USING A SINGLE OPTICAL RECEIVER

(75) Inventors: Wayne V. Sorin, Mountain View, CA (US); Douglas M. Baney, Los Altos, CA (US); Bogdan Szafraniec, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 539 days.

(21) Appl. No.: 09/643,374

(22) Filed: Aug. 22, 2000

(51) Int. Cl.[7] ........................ H04B 10/00; H04B 10/06; H04B 10/08

(52) U.S. Cl. ........................ 398/161; 398/9; 398/16; 398/33; 398/2.4; 398/2.7

(58) Field of Search ................................ 398/16, 31, 9, 398/13, 20, 24, 25, 38, 161, 204, 207, 33; 356/484, 309, 72, 73

(56) References Cited

U.S. PATENT DOCUMENTS

| | | | |
|---|---|---|---|
| 5,268,738 A | * 12/1993 | Baney et al. | ................ 356/479 |
| 5,767,957 A | 6/1998 | Barringer et al. | .......... 356/73.1 |
| 5,923,683 A | * 7/1999 | Morioka et al. | ................ 372/6 |
| 6,023,358 A | 2/2000 | Baney | ........................ 359/110 |
| 6,603,112 B1 | * 8/2003 | Medard et al. | ........ 250/227.11 |

* cited by examiner

Primary Examiner—M. R. Sedighian (57) ABSTRACT

A system for measuring optical characteristics of a multiport optical device uses optical heterodyne detection and known port-specific transmission delays to simultaneously monitor multiple ports of the multiport optical device with a single receiver. An embodiment of a system includes a splitter configured to split a swept optical signal into a reference signal and a test signal and a test system input, connectable to the multiport optical device, for transmitting the test signal to the multiport optical device. The test system also includes an optical combiner and a receiver. The optical combiner is connectable to the multiport optical device to receive a first portion of the test signal having a first port-specific transmission delay and to receive a second portion of the test signal having a second port-specific transmission delay. The optical combiner combines the first portion of the test signal having the first transmission delay and the second portion of the test signal having the second transmission delay with the reference signal. The receiver is connected to the optical combiner to detect a first optical heterodyne signal that is generated from the combined first portion of the test signal and the reference signal and to detect a second optical heterodyne signal that is generated from the combined second portion of the test signal and the reference signal. The system includes port-specific transmission delay units connected to ports of the multiport device and each of the port-specific transmission delay units imparts a different transmission delay on an optical signal.

20 Claims, 7 Drawing Sheets

MULTIPORT OPTICAL COMPONENT TESTING USING A SINGLE OPTICAL RECEIVER

FIELD OF THE INVENTION

The invention relates to optical communications systems, and more particularly to measuring optical characteristics of multiport optical communications components.

BACKGROUND OF THE INVENTION

Optical components with multiple input and/or output ports are being used to support optical communications systems. Multiport optical components are especially important to next generation optical communications systems that use wavelength division multiplexing (WDM) to simultaneously transmit multiple carrier wavelengths over the same optical fiber. As optical component technologies have advanced, the number of multiplexed wavelengths and the number of ports per optical component have increased. For example, current optical communications systems multiplex from eight to thirty-two carrier wavelengths over the same optical fiber and future systems are expected to multiplex hundreds to thousands of carrier wavelengths over the same optical fiber.

Figure 1:
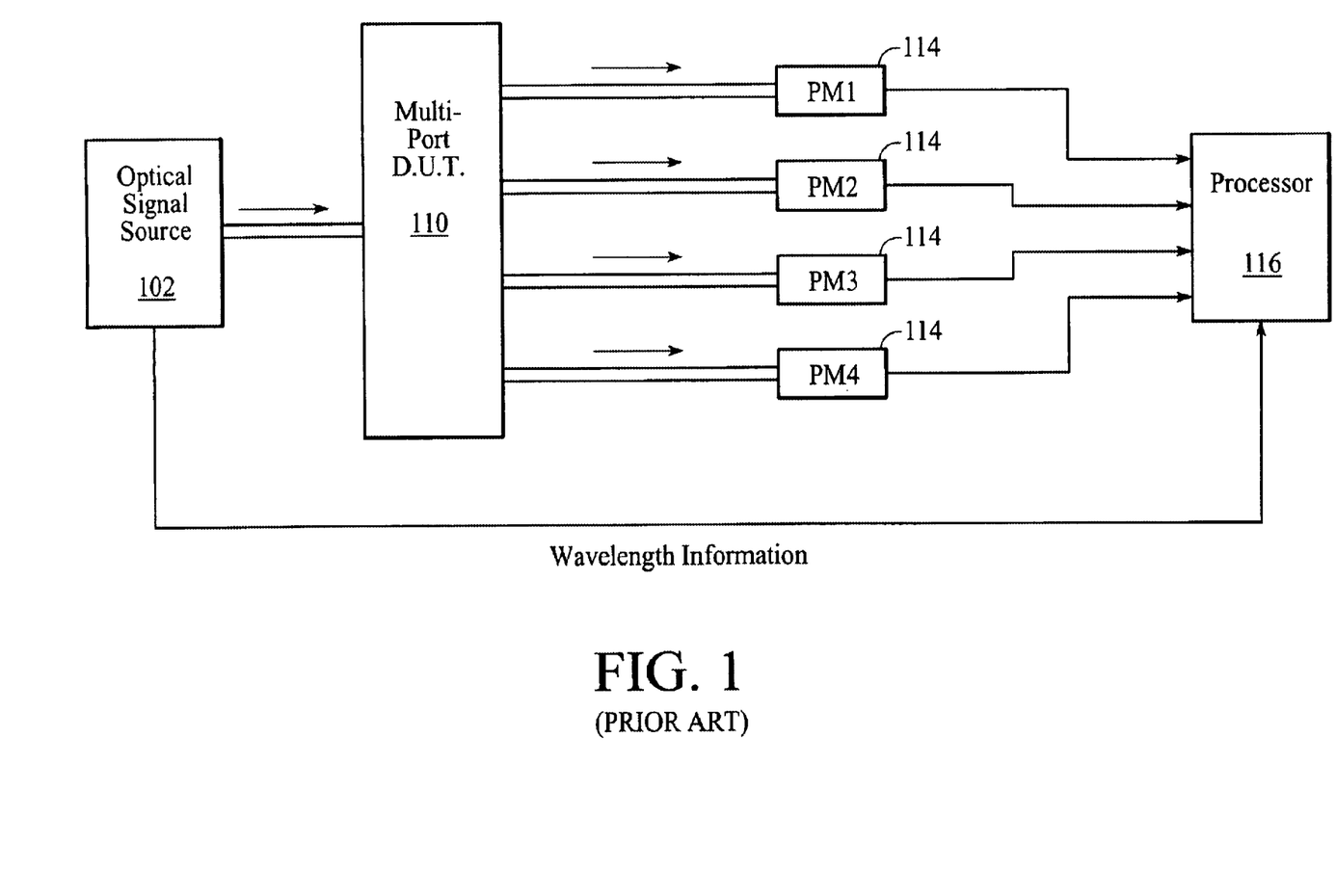
FIG. 1 depicts a prior art testing system that utilizes multiple port-specific power meters to test optical characteristics of a multiport optical component.

During the development and testing of multiport optical components, it is necessary to measure the optical characteristics of each port of an optical component. Known techniques for measuring the optical characteristics of each port of a multiport optical component typically involve utilizing port-specific power meters to simultaneously measure responses to known input signals. For example, referring to FIG. 1, a prior art testing system involves injecting a known optical signal from an optical signal source 102 into a multiport component 110 and then measuring the optical characteristics of the optical signals that are output from multiple output ports of the multiport component. The optical characteristics of port-specific optical signals are measured with multiple port-specific power meters 114. Electrical signals generated by the port-specific power meters are then fed into a processor 116 and used to characterize the multiport component. Although utilizing multiple port-specific power meters works well to characterize a multiport component, each test system requires a dedicated power meter for each port that is tested. Power meters are expensive components of test systems and as the number of ports required for WDM communications systems increases, the number of power meters needed per testing system increases.

Another technique for measuring optical characteristics of a multiport optical component is disclosed in U.S. Pat. No. 6,023,358 issued to Baney and assigned to the assignee of this disclosure. The technique involves an optical interface device that utilizes the combination of a stimulus generator, multiplexers, couplers, and a signal analyzer to apply a light signal, one port at a time, to each port of the multiport optical component and to measure the response signal, one port at a time, that is output from each port of the multiport component. While the technique uses only one signal analyzer to measure the output response from each port of the multiport component, testing the ports is a serial operation that must be performed one port at a time. That is, the response from only one port can be measured without reconfiguring optical paths established by the multiplexers and couplers. As the number of ports in multiport components increases, reconfiguring optical paths becomes less desirable.

In view of the increasing port density of optical components and the disadvantages of prior art testing systems, what is needed is a highly scaleable multiport testing system that allows efficient testing of multiport optical components.

SUMMARY OF THE INVENTION

A system for measuring optical characteristics of a multiport optical device uses optical heterodyne detection and known port-specific transmission delays to simultaneously monitor multiple ports of the multiport optical device with a single receiver.

An embodiment of a system for measuring optical characteristics of a multiport optical device includes a splitter configured to split a swept optical signal into a reference signal and a test signal and a test system input, connectable to the multiport optical device, for transmitting the test signal to the multiport optical device. The test system also includes an optical combiner and a receiver. The optical combiner is connectable to the multiport optical device to receive a first portion of the test signal having a first port-specific transmission delay and to receive a second portion of the test signal having a second port-specific transmission delay. The optical combiner combines the first portion of the test signal having the first transmission delay and the second portion of the test signal having the second transmission delay with the reference signal. The receiver is connected to the optical combiner to detect a first optical heterodyne signal that is generated from the combined first portion of the test signal and the reference signal and to detect a second optical heterodyne signal that is generated from the combined second portion of the test signal and the reference signal.

An embodiment of the test system includes port-specific transmission delay units connected to ports of the multiport device. In an embodiment, each of the port-specific transmission delay units imparts a different transmission delay on an optical signal. In an embodiment, each of the port-specific transmission delay units is optically connected to the test system input.

An embodiment of the test system includes a processor connected to the receiver for selectively isolating one of the first and second optical heterodyne signals. In an embodiment, a frequency counter is optically connected to receive a portion of the swept optical signal and the frequency counter generates frequency information related to the swept optical signal. In an embodiment there is an electrical connection between the frequency counter and the heterodyne receiver for distributing the frequency information to the heterodyne receiver. In an embodiment there is an electrical connection between the frequency counter and the processor for distributing the frequency information to the processor.

Another embodiment of an optical system for testing a multiport optical device having a first port and a second port includes a tunable optical signal source or generating a swept optical signal and a splitter configured to split the swept optical signal into a reference signal and a test signal. The system includes a first port-specific transmission delay unit, optically connectable to the multiport optical device, for imparting a first port-specific transmission delay onto a first portion of the test signal that is specific to said first port and a second port-specific transmission delay unit, optically connectable to said multiport optical device, for imparting a second port-specific transmission delay onto a second portion of said test signal that is specific to the second port. The system includes an optical combiner and a heterodyne receiver. The optical combiner is optically connectable to the multiport device under test to combine the delayed first portion of the test signal and the delayed second portion of the test signal with the reference signal. The heterodyne receiver is connected to the optical combiner to detect a first optical heterodyne signal that is generated from the combined delayed first portion of the test signal and the reference signal and to detect a second optical heterodyne signal that is generated from the combined delayed second portion of the test signal and the reference signal.

A method for measuring optical characteristics of a multiport optical device includes steps of splitting a swept optical signal into a reference signal and a test signal and then splitting the test signal into a first port-specific portion that is specific to a first port of the multiport optical device and into a second port-specific portion that is specific to a second port of the multiport optical device. A first port-specific transmission delay is imparted onto the first port-specific portion of the test signal and a second port-specific transmission delay is imparted onto the second port-specific portion of the test signal. The delayed first port-specific portion of the test signal is combined with the reference signal to generate a first optical heterodyne signal and the first optical heterodyne signal is detected. The delayed second port-specific portion of the test signal is combined with the reference signal to generate a second optical heterodyne signal and the second optical heterodyne signal is detected. A port-specific optical characteristic of the multiport optical device is determined from one of the first and second detected optical heterodyne signals. In an embodiment, one of the first and second detected optical heterodyne signals is electronically isolated from the other signal.

An advantage of the test system is that the port-specific signals are differentiated by their transmission delay and therefore a device under test with multiple outputs can be characterized utilizing a single heterodyne receiver. Because the number of receivers does not change as the number of outputs increases, the test system is highly scaleable.

DETAILED DESCRIPTION OF THE INVENTION

A system for measuring optical characteristics of a multiport optical component involves using optical heterodyne detection and known port-specific transmission delays to simultaneously monitor multiple ports of the multiport optical component with a single receiver.

Figure 2:
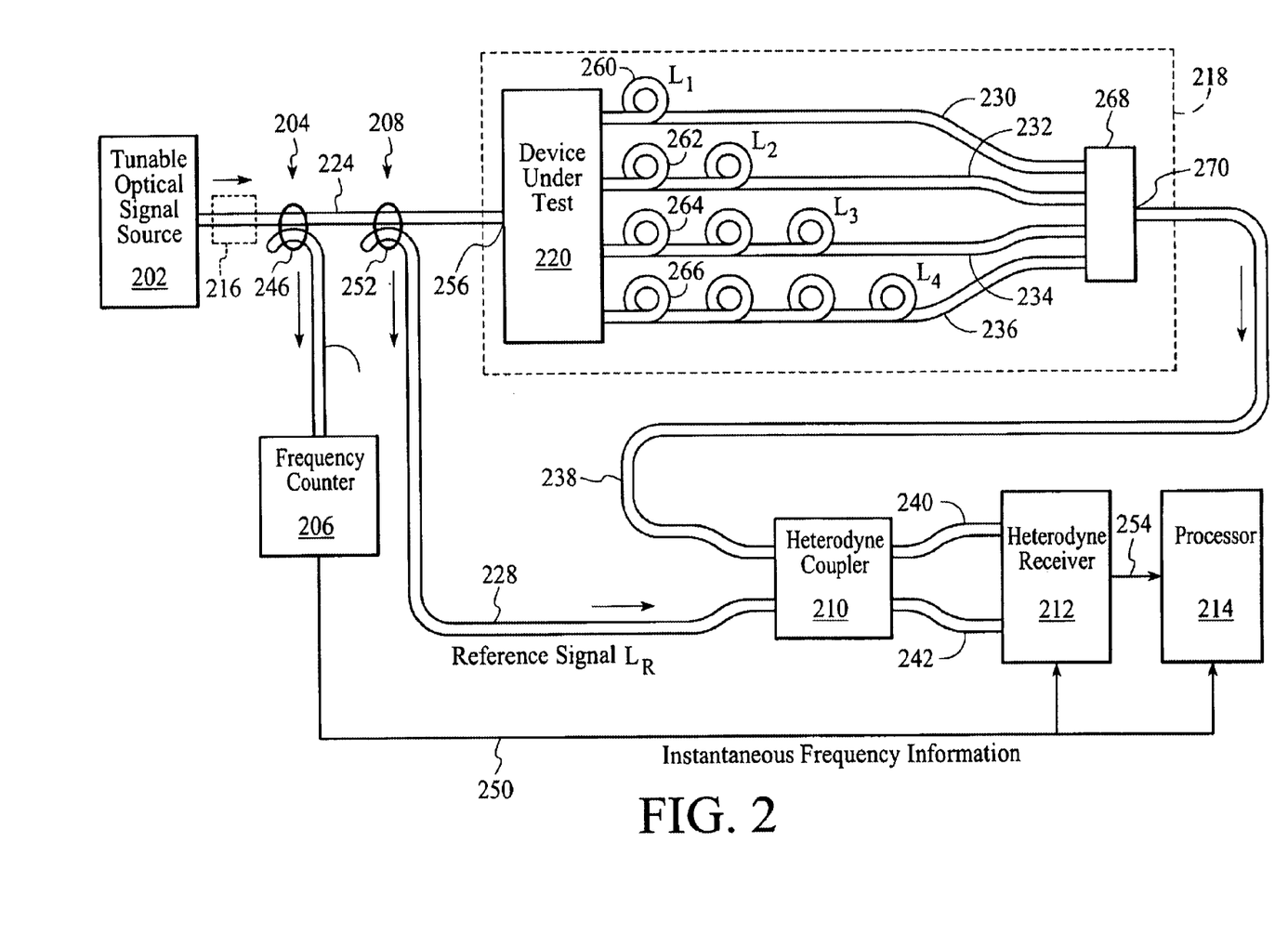
FIG. 2 depicts a testing system that utilizes optical heterodyne detection and known port-specific transmission delay units to test optical characteristics of a multiplexer in accordance with an embodiment of the invention.

FIG. 2 depicts an embodiment of a system that utilizes optical heterodyne detection and known port-specific transmission delays to measure optical characteristics of a multiport optical component with a single receiver. The multiport optical component may also be referred to as the "device under test" or DUT. The system of FIG. 2 includes a tunable optical signal source 202, a frequency counter tap 204, a frequency counter 206, a reference signal tap 208, a heterodyne coupler 210, a heterodyne receiver 212, a processor 214, and a device-specific test system, indicated by dashed line box 218, that includes the device under test 220. The individual elements of the system are described first, followed by a description of the system operation and descriptions of various alternative embodiments of the system. It should be noted that throughout the description, similar reference numerals are utilized to identify similar elements.

The tunable optical signal source 202 generates the optical signal that is input into the device-specific test system 218 and that is utilized as the reference signal. In an embodiment, the tunable optical signal source is a wideband tunable laser that is tunable over a wavelength range of one nanometer or greater. During testing of the device under test 220, the tunable optical signal source is typically swept across a range of wavelengths to characterize the response of the device under test over the range of wavelengths. Preferably, the sweep rate (Y) of the tunable optical signal source is approximately linear over the wavelength range. That is, $Y=df/dt=$constant, where $df=$change in frequency, and $dt=$change of time.

The optical fibers 224, 226, 228, 230, 232, 234, 236, 238, 240, and 242 depicted in the system may include single mode optical fibers that form optical paths for carrying the various optical signals. Other optical waveguides may be used in place of optical fibers to form optical paths. Alternatively, the optical signals may be transmitted through free space without the use of waveguides.

In an embodiment, a polarization controller (as indicated by dashed box 216) is integrated with optical fiber 224 to allow control of the polarization state of the optical signal that is generated from the tunable optical signal source 202. The polarization controller allows the determination of polarization dependent properties of the device under test.

The frequency counter tap 204 is located between the tunable optical signal source 202 and the device-specific test system 218. The frequency counter tap diverts a portion of the optical signal from the tunable optical signal source and directs the tapped portion of the optical signal to the frequency counter 206. In an embodiment, the frequency counter tap includes an optical coupler 246 and the optical tap fiber 226.

The frequency counter 206 is optically connected to the frequency counter tap 204 to measure the frequency (alternatively referred to in terms of wavelength) of the optical signal that is generated by the tunable optical signal source 202. Preferably, the frequency counter obtains a real-time measure of the frequency of the optical signal as the signal is swept across a range of frequencies. The frequency counter outputs instantaneous frequency information, through an electrical connection 250, to the heterodyne receiver 212 and/or the processor 214 for use in optical spectrum analysis. The instantaneous frequency information for the local oscillator signal is used to determine the local oscillator frequency at which the heterodyne signal is detected. Frequency counters are known in the field of optical communications and are not described further. Although a frequency counter tap and frequency counter are depicted in the embodiment of FIG. 2, it should be understood that frequency information may be provided from another source such as the tunable optical signal source itself.

The reference signal tap 208 is also located between the tunable optical signal source 202 and the device-specific test system 218. The reference signal tap diverts a portion of the optical signal from the tunable optical signal source and directs the tapped portion of the optical signal to the heterodyne coupler 210 for use as a reference signal. In an embodiment, the reference signal tap includes an optical coupler 252 and the optical tap fiber 228. The optical tap fiber has a known length $L_R$ that imparts a known transmission delay $t_R$ on the reference signal. Although the reference signal tap and the frequency counter tap 204 are depicted as separate devices, in an embodiment, a single coupler and a subsequent tap or splitter may be utilized to distribute the optical signal from the tunable optical signal source to the frequency counter and to the heterodyne coupler.

The heterodyne coupler 210 optically combines the reference signal with the signal that is output from the device-specific test system 218 and outputs at least one beam of a combined optical signal to the heterodyne receiver 212. In the embodiment of FIG. 2, the coupler outputs two beams of the combined optical signal to the heterodyne receiver through optical fibers 240 and 242 so that optical spectrum analysis can be performed irrespective of the polarization state of the reference signal as is known in the field. The combined optical signal beams include the heterodyne signals, or beat frequencies, that are utilized for optical spectrum analysis In an embodiment, the heterodyne coupler 210 includes an optical combiner that outputs the combined optical signal into two optical paths. The optical combiner may be an optically directional 3dB fiber coupler, although other optical couplers may be utilized. In an embodiment, coupling of the optical signals is substantially independent of the polarization state of the optical signals. In an embodiment, the heterodyne coupler does not polarize the combined optical signal. Although the heterodyne coupler is described as outputting two beams of the combined optical signal, it should be understood that embodiments of the heterodyne coupler that output one beam or more than two beams of the combined optical signal are possible. More than two beams of the combined optical signal may be utilized with a balanced receiver to balance out noise that degrades the signal-to-noise ratio of the heterodyne signal.

The heterodyne receiver 212 is aligned to detect the beams that are output from the heterodyne coupler 210. The heterodyne receiver generates electrical signals in response to the beams. Although not shown, the heterodyne receiver includes photodetectors and circuitry such as signal amplifiers and filters, as is known in the field. The electrical signals generated by the heterodyne receiver are provided to the processor 214 for signal processing. The electrical connection between the heterodyne receiver and the processor is depicted in FIG. 2 by line 254.

The processor 214 receives the electrical signals from the heterodyne receiver and processes the electrical signals to determine port-specific optical characteristics of the multiport device under test 220. In an embodiment, the processor also utilizes the frequency information from the frequency counter 206 to characterize the multiport device under test. The processor may include analog signal processing circuitry and/or digital signal processing circuitry and support software as is known in the field of electrical signal processing. As described below, the processor may include frequency domain filters to differentiate port-specific heterodyne signals. In an embodiment, an analog signal from the photodetector is converted into digital signals and the digital signals are subsequently processed.

The device-specific test system 218 includes the device under test 220 and components that are specific to the configuration of the device under test. The device-specific test system depicted in FIG. 2 includes a test system input 256, the four-output device under test, four output fibers 230, 232, 234, and 236, four port-specific transmission delay units 260, 262, 264, and 266, a 4×1 coupler 268, and a test system output 270. It should be noted that although a device under test with four outputs is described, other embodiments may include significantly more outputs. The device under test may also have fewer than four outputs.

The test system input 256 in the embodiment of FIG. 2 is the point where the optical signal from the tunable optical signal source 202 enters the device under test 220. As will become evident, the exact location and form of the test system input is dependent on the configuration of the multiport device under test.

In the embodiment of FIG. 2, the four-output device under test 220 is a demultiplexer that is able to output specific carrier wavelengths from each output port. For example, in a WDM system that utilizes thirty-two multiplexed carrier wavelengths, each output can selectively transmit any combination of the thirty-two multiplexed carrier wavelengths. The four-output device under test has four output ports that are connected to the four port-specific output fibers 230, 232, 234, and 236.

The four port-specific transmission delay units 260, 262, 264, and 266 are located along the four port-specific output fibers 230, 232, 234, and 236. The port-specific transmission delay units impart port-specific delays on the optical signals that exit the respective outputs of the device under test 220. Each of the port-specific transmission delay units imparts a different delay time on the respective optical signal such that no two output signals have the same delay time. As is described below, the different delay times imparted on the port-specific signals are key to differentiating the port-specific signals from each other. In the embodiment of FIG. 2, the four port-specific transmission delay units include extended sections of optical fiber, identified as $L_1$, $L_2$, $L_3$, and $L_4$ that impart delays of $t_1$, $t_2$, $t_3$, and $t_4$ respectively, onto the optical signals. It should be noted that although the port-specific transmission delay units are identified as specific units, the port-specific transmission delay units may simply be port-specific output fibers that are set to specific lengths or other known transmission delay units.

The 4×1 coupler 268 optically couples the four port-specific optical signals from the device under test 220 into a combined optical signal. The combined optical signal is output through the test system output 270. The test system output in the embodiment of FIG. 2 is the point where the combined optical signal from the device under test exits the 4×1 coupler. As with the test system input, the exact location and form of the test system output is dependent on the configuration of the multiport device under test. In any case, the test system output is optically connected to the heterodyne coupler 210.

In operation, the tunable optical signal source 202 generates an optical signal that is swept across a known range of frequencies at a linear sweep rate (df/dt). A portion of the swept optical signal is tapped by the frequency counter tap 204 and measured by the frequency counter 206 to produce instantaneous frequency information that is forwarded to the heterodyne receiver 212 and/or the processor 214 for use in tracking the frequencies of the heterodyne signals. Another portion of the swept optical signal is tapped by the reference signal tap 208 and used as a reference signal. The reference signal propagates to the heterodyne coupler 210 through the reference signal fiber 228 with a transmission delay of $t_R$. The remaining portion of the swept optical signal enters the device-specific test system 218 through the test system input 256.

In the embodiment of FIG. 2, the remaining portion of the swept optical signal enters directly into the device under test. The device under test then divides the incoming signal into as many as four separate output signals. The signals that are output from each port of the device under test depend on the settings of the device under test. Typically, the signals output from the device under test will vary with the sweep of the optical signal from the tunable optical signal source. The port specific signals that exit the device under test are subjected to port-specific transmission delays $t_1$, $t_2$, $t_3$, and $t_4$ that are imparted by the respective port-specific transmission delay units 260, 262, 264, and 266. The delayed signals are then coupled together into the same fiber 238 by the 4×1 coupler 268. The combined optical signal, which includes the four delayed signals, is then combined with the reference signal at the heterodyne coupler. Combining the two signals causes the generation of a different heterodyne signal for each one of the delayed port-specific signals. The port-specific heterodyne signals are output from the heterodyne coupler and detected by the heterodyne receiver.

Figure 3:
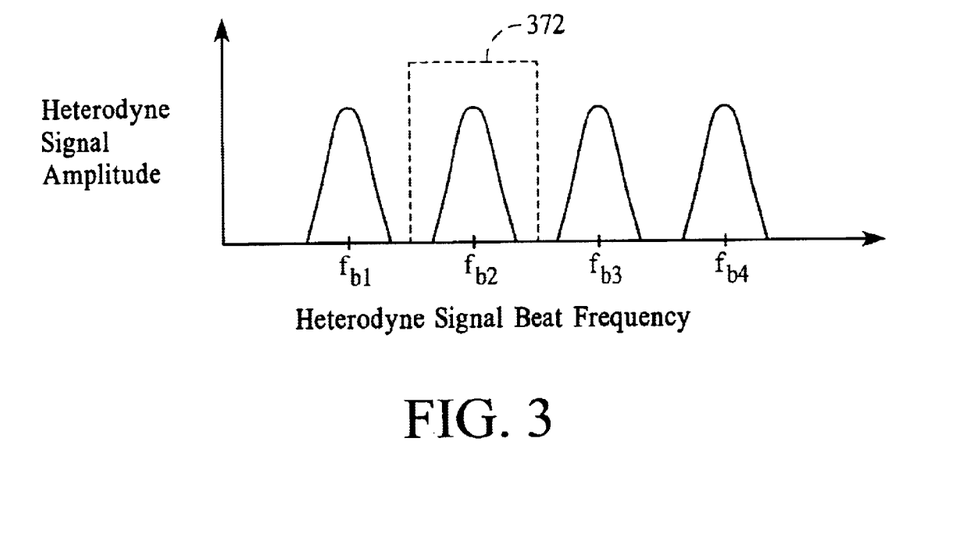
FIG. 3 depicts an example of optical heterodyne signal peaks that may be generated in the testing system of FIG. 2.

Because the tunable optical signal source 202 is swept approximately linearly with time and because the transmission delay times $t_1$–$t_4$ are different for each output of the device under test 220, the heterodyne signals occur for each port-specific signal at a different beat frequency. FIG. 3 is an example graph of four port-specific heterodyne signals at the respective beat frequency $f_{b1}$–$f_{b4}$ that may be generated in the system of FIG. 2. As shown in FIG. 3, the four signal peaks indicate the transmission of a port-specific signal through each one of the four respective outputs. The actual optical signal frequencies that are being passed by the respective outputs can be calculated using the instantaneous frequency information, the linear sweep rate of the tunable optical signal source, and the delay times $t_1$–$t_4$ and $t_R$.

In the embodiment of FIG. 2, the port-specific transmission delay for port 1 relative to the reference signal is determined by:

$$\Delta t_1 = n(L_1 - L_R)/c$$

where n=constant c=speed of light and the beat frequency of the port 1 heterodyne term ($f_{b1}$) is determined by:

$$f_{b1} = Y \Delta t_1,$$

where Y=df/dt=rate of change of the swept optical signal generated from the tunable optical signal source.

Port-specific optical characteristics of a device under test can be determined by separating the port-specific signals shown in the graph of FIG. 3. The port-specific signals can be separated from the other heterodyne signals by filtering the appropriate frequency bands utilizing hardware and/or software based filtering techniques. For example, referring to FIG. 3, the frequency band related to port 2 can be isolated by filtering the frequency bands outside the desired frequency band 372. In an embodiment, a Fast Fourier Transform algorithm can be utilized to isolate port-specific signals. Because the optical heterodyne signals are generated with a swept optical signal, the test system can measure both the amplitude and phase response of the device under test.

Because the optical signals utilized to characterize each output of the device under test in FIG. 2 are differentiated by their transmission delay, a device under test with multiple outputs can be characterized utilizing a single heterodyne receiver. The test system is highly scaleable because the number of receivers does not change as the number of outputs increases. The only change required to scale the test system is the addition of more port-specific transmission delay units and an appropriately scaled n×1 coupler.

Figure 4:
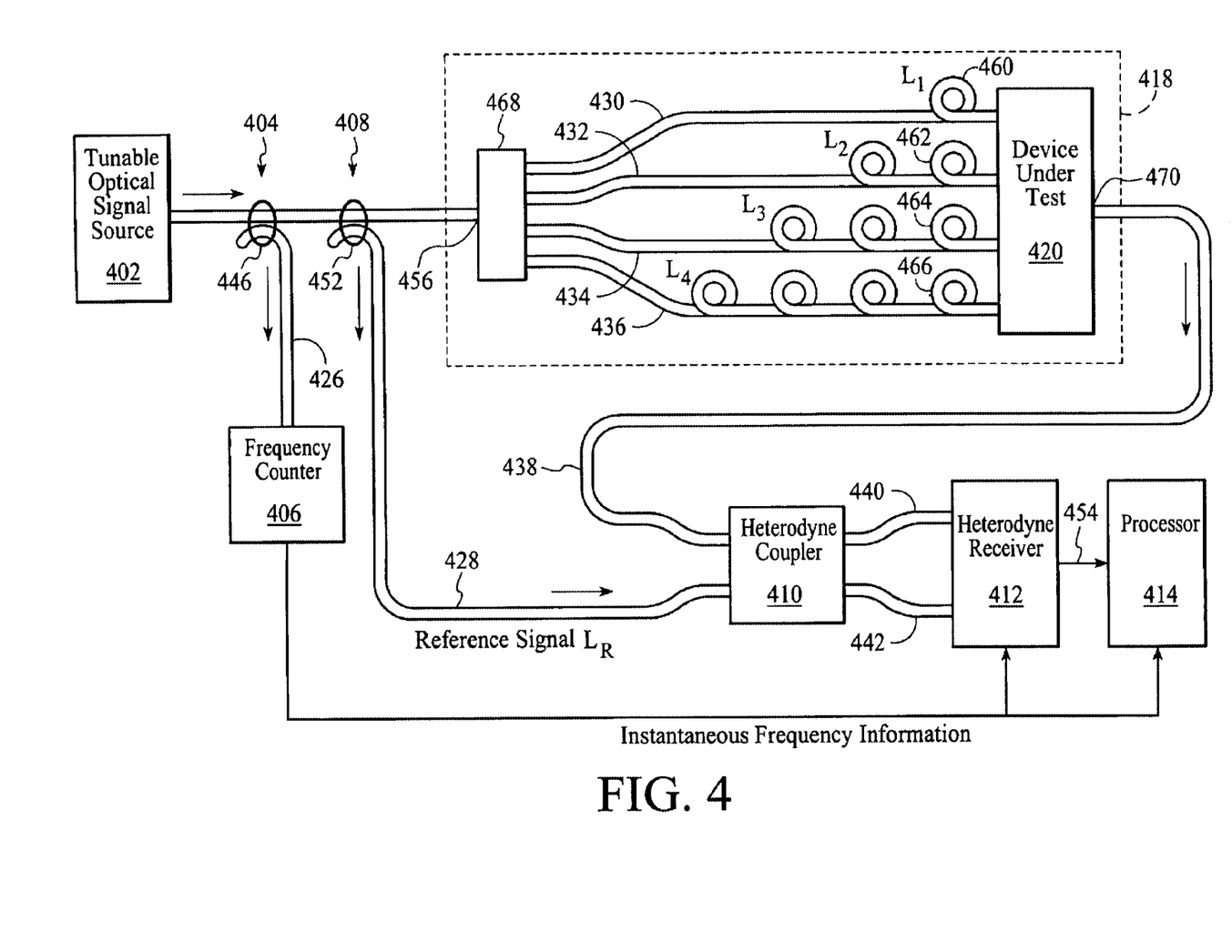
FIG. 4 depicts a testing system that utilizes optical heterodyne detection and known port-specific transmission delay units to test optical characteristics of a demultiplexer in accordance with an embodiment of the invention.
Figure 5:
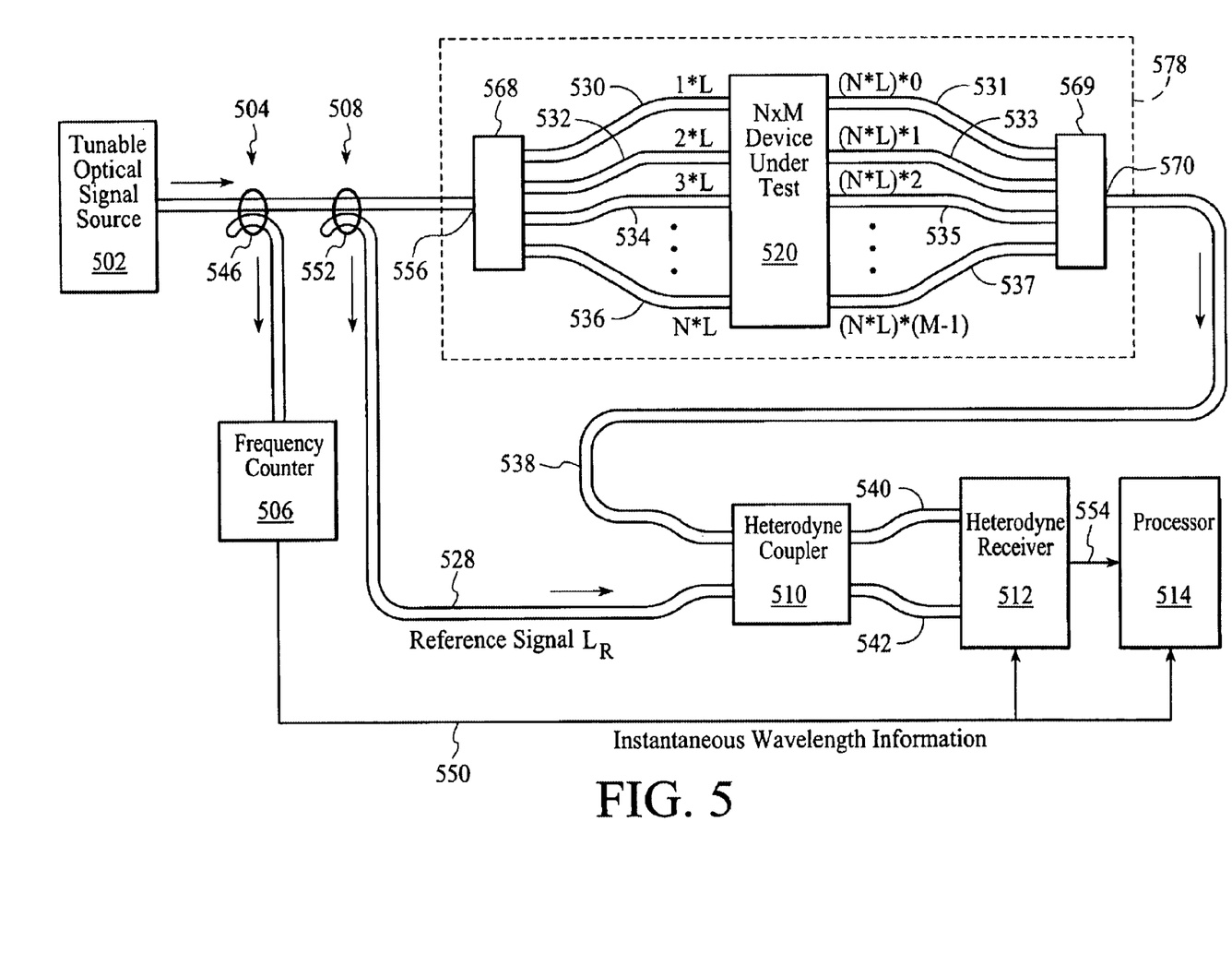
FIG. 5 depicts a testing system that utilizes optical heterodyne detection and known port-specific transmission delay units to test optical characteristics of an optical cross-connect in accordance with an embodiment of the invention.
Figure 6:
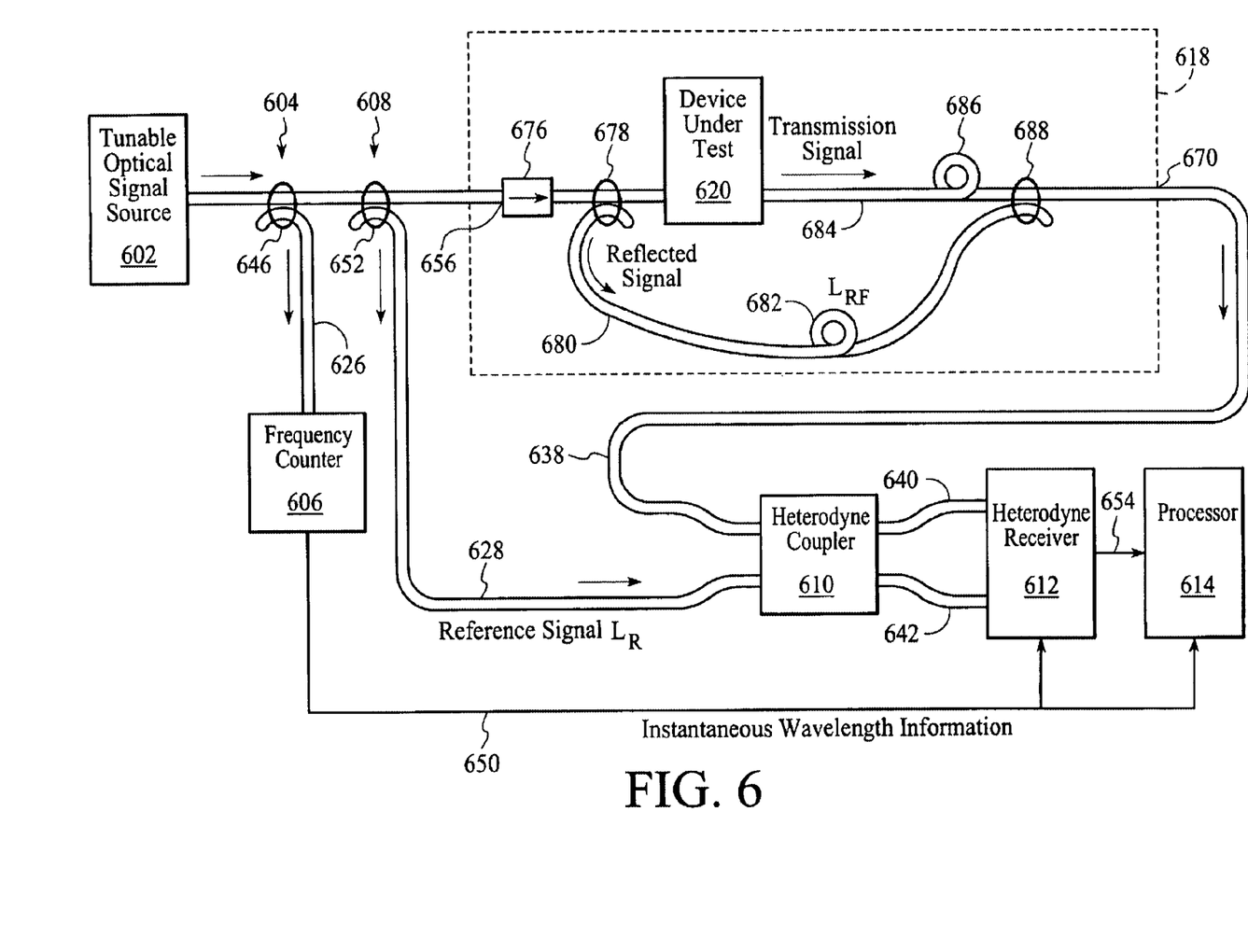
FIG. 6 depicts a testing system that utilizes optical heterodyne detection and known port-specific transmission delay units to test optical characteristics of an optical component with reflective capabilities in accordance with an embodiment of the invention.

There are various types of multiport components that need to be characterized in optical communications systems besides demultiplexers, therefore the test system described with reference to FIG. 2 must be flexible. The basic test system described with reference to FIG. 2 can be used to test many different types of multiport components with only minor modifications to the components within the device-specific test system 218. FIGS. 4–6 represent alternative embodiments of device-specific test systems that have been configured to support different types of optical components.

FIG. 4 is a depiction of a test system that is similar to the test system of FIG. 2 except that the device-specific test system 418 is modified to allow testing of a wavelength division multiplexer. The system of FIG. 4 includes the same tunable optical signal source 402, frequency counter tap 404, frequency counter 406, reference signal tap 408, heterodyne coupler 410, heterodyne receiver 412, and processor 414 however the device-specific test system is configured to test a device under test 420 that includes four inputs and one output. It should be noted that throughout the description of alternative embodiments, similar reference numerals are utilized to identify similar elements.

The device-specific test system 418 of FIG. 4 includes a test system input 456, a 1×4 splitter 468, four input fibers 430, 432, 434, and 436, four port-specific transmission delay units 460, 462, 464, and 466, the four port device under test 420, and a test system output 470. It should be noted that although the device under test has four inputs, the device-specific test system can be scaled up to accommodate a device under test with more inputs. Likewise, the device under test may have fewer than four outputs.

The test system input 456 in the device-specific test system 418 of FIG. 4 is the point where the optical signal from the tunable optical signal source 402 enters the 1×4 splitter 468. The 1×4 splitter divides the input optical signal into four separate, and preferably equal intensity, optical signals.

The four port-specific transmission delay units 460, 462, 464, and 466 are located along the four input fibers 430, 432, 434, and 436. The port-specific transmission delay units impart port-specific transmission delays on the optical signals that enter the respective ports of the device under test 420. Each of the port-specific transmission delay units must impart a different transmission delay on the respective optical signal such that no two signals have the same transmission delay time. In the embodiment of FIG. 4, the four port-specific transmission delay units include extended sections of optical fiber, identified as $L_1$, $L_2$, $L_3$, and $L_4$, that impart delays of $t_1$, $t_2$, $t_3$, and $t_4$ respectively, onto the optical signals.

In the embodiment of FIG. 4, the device under test 420 is a wavelength division multiplexer that multiplexes optical signals from four input ports into the same output port. The test system output 470 is the point where the multiplexed optical signal exits the device under test.

In operation, the tunable optical signal source 402 generates an optical signal that is swept across a known range of frequencies at a linear sweep rate (df/dt). A portion of the swept optical signal is tapped by the frequency counter tap 404 and measured by the frequency counter 406 to produce instantaneous frequency information that is forwarded to the heterodyne receiver 412 and/or the processor 414. Another portion of the swept optical signal is tapped by the reference signal tap 408 and utilized as a reference signal that is combined with the signal from the device under test 420. The reference signal propagates to the heterodyne coupler 410 through the reference signal fiber 428 with a transmission delay of $t_R$.

The remaining portion of the swept optical signal enters the device-specific test system 418 through the test system input 456 where the 1×4 splitter 468 splits the signal into four separate, and preferably equal intensity, optical signals that are transmitted over the four separate optical fibers 430, 432, 434, and 436. A different transmission delay is imparted on each one of the four optical signals by the four port-specific transmission delay units 460, 462, 464, and 466. The delayed signals are then multiplexed into a combined optical signal by the device under test. The combined optical signal exits the device under test at the test system output 470 and is transmitted to the heterodyne coupler 410 for coupling with the reference signal. The characteristic of the signal that is output from the device under test depends on the settings of the device under test and may vary with the sweep of the optical signal from the tunable optical signal source.

The combined optical signal, which includes the four delayed signals, is then combined with the reference signal at the heterodyne coupler 410. Combining the two signals causes the generation of a different heterodyne signal related to each one of the delayed signals. The heterodyne signals are output from the heterodyne coupler and detected by the heterodyne receiver 412.

Because the tunable optical signal source 402 is swept approximately linearly with time and since the transmission delay times $t_1$–$t_4$ are different for each port, the transmitted signal from each port will generate a heterodyne signal at a different beat frequency. The port-specific optical characteristics can be determined by separating the port-specific signals. Although the device under test 420 includes four inputs for characterization, a single heterodyne receiver is sufficient because the port-specific signals are combined into a single output fiber yet differentiated by port-specific transmission delays.

FIG. 5 depicts an example test system in which the device-specific test system 518 is modified to allow testing of an optical cross-connect. The test system of FIG. 5 includes the same tunable optical signal source 502, frequency counter tap 504, frequency counter 506, reference signal tap 508, heterodyne coupler 510, heterodyne receiver 512, and processor 514 as the systems of FIGS. 2 and 4 however the device-specific test system is configured to test a device under test 520 that includes N inputs and M outputs.

The device-specific test system 518 of FIG. 5 includes a test system input 556, a 1×N splitter 568, N input fibers 530, 532, 534, and 536, the N×M optical cross-connect 520, M output fibers 531, 533, 535, and 537, a M×1 coupler 569, and a test system output 570.

The test system input 556 in the device-specific test system 518 of FIG. 5 is the point where the optical signal from the tunable optical signal source 502 enters the 1×N splitter 568. The 1×N splitter divides the input optical signal into N separate, and preferably equal intensity, optical signals.

The N input fibers 530, 532, 534, and 536 correspond to the N inputs of the N×M optical cross-connect 520. Each of the N input fibers forms an input port-specific transmission delay unit. In the embodiment of FIG. 5, the input port-specific transmission delay units include a known fiber length, L, which imparts a known transmission delay t on the respective optical signal. In the embodiment of FIG. 5, the input port-specific transmission delay units include fiber lengths of N*L, where N is the input number, 1, 2, 3 . . . . . N. Although shown as fiber loops in FIGS. 2 and 4, it should be understood that the transmission delay units may simply be fibers with known lengths and corresponding transmission delays.

The M output fibers 531, 533, 535, and 537 correspond to the M outputs of the N×M optical cross-connect. Each of the M output fibers forms an output specific transmission delay unit. In the embodiment of FIG. 5, the output port-specific transmission delay units include fiber lengths that are also based on L. In the embodiment of FIG. 5, the output port-specific transmission delay units include fiber lengths of (N*L) * (M−1), where N is the input number, 1, 2, 3 . . . . N and M is the output number, 1, 2, 3 . . . . M. The combination of the input delays and the output delays creates a delay system that is analogous to a counter of base N*L. The combination of the input delays and the output delays imparts unique delays on all of the signals that are generated from all of the combinations of inputs and outputs.

The principles of operation for the system of FIG. 5 are essentially the same as the principles of operation for the systems described with reference to FIGS. 2–4 except that the test system of FIG. 5 measures the optical characteristics of an input and output combination instead of a single input or a single output. That is, the device-specific test system 518 of FIG. 5 imparts port-specific transmission delays on the signals that pass through a particular input and output combination. As with the systems of FIGS. 2 and 4, the signals that pass through the device under test 520 are combined into a single output fiber 538 before being input into the heterodyne coupler 510. The heterodyne signals that are generated in the heterodyne coupler have port-specific delays that are specific to particular input and output combinations. The heterodyne signals can be differentiated from each other as described above with reference to FIGS. 2 and 3.

FIG. 6 depicts an example test system in which the device-specific test system 618 is modified to allow simultaneous testing of reflective and transmissive characteristics of a device under test 620 with a single heterodyne receiver 612. The system of FIG. 6 includes the same tunable optical signal source 602, frequency counter tap 604, frequency counter 606, reference signal tap 608, heterodyne coupler 610, heterodyne receiver 612, and processor 614 as the systems of FIGS. 2, 4, and 5 however the device-specific test system is configured to test a device under test that includes a reflected output signal.

The device-specific test system 618 of FIG. 6 includes a test system input 656, an isolator 676, a first signal coupler 678, a reflected signal fiber 680, a reflected signal delay unit 682, the device under test 620, a transmitted signal fiber 684, a transmitted signal delay unit 686, a second coupler 688, and a test system output 670. It should be noted that although the device under test has one transmissive output, the device-specific test system can be scaled up to accommodate a device under test with multiple transmissive outputs.

The test system input 656 in the device-specific test system 618 of FIG. 6 is the point where the optical signal from the tunable optical signal source 602 enters the isolator 676. The isolator prevents reflected signals from propagating into the frequency counter 606 or the reference signal fiber 628.

The reflected signal fiber 680 includes the reflected signal delay unit 682. The reflected signal delay unit has a fiber length $L_{RF}$ that imparts a delay, $t_{RF}$, on the reflected optical signal. The transmitted signal delay unit 686 has a length $L_{TM}$ that imparts a delay, $t_{TM}$, on the transmitted optical signal. Each of the delay units must impart a different delay on the respective reflected and transmitted optical signals so that the resulting heterodyne signals can be differentiated as described above.

In operation, a portion of the swept optical signal from the tunable optical signal source 602 is reflected by the device under test 620. The reflected portion of the swept optical signal is coupled into the reflected signal fiber 680 and subjected to a delay $t_{RF}$. The portion of the swept optical signal that is transmitted by the device under test passes through the transmitted signal delay unit 686 and is subjected to a delay of $t_{TM}$. The reflected and transmitted signals are combined by the second coupler 688 into the test system output 670 and optically connected to the heterodyne coupler 610. The heterodyne coupler combines the reflected and transmitted signals with the reference signal and optical heterodyne signals specific to the reflected and transmitted signals are generated. The reflected and transmitted heterodyne signals can be differentiated as described above with reference to FIGS. 2 and 3.

Figure 7:
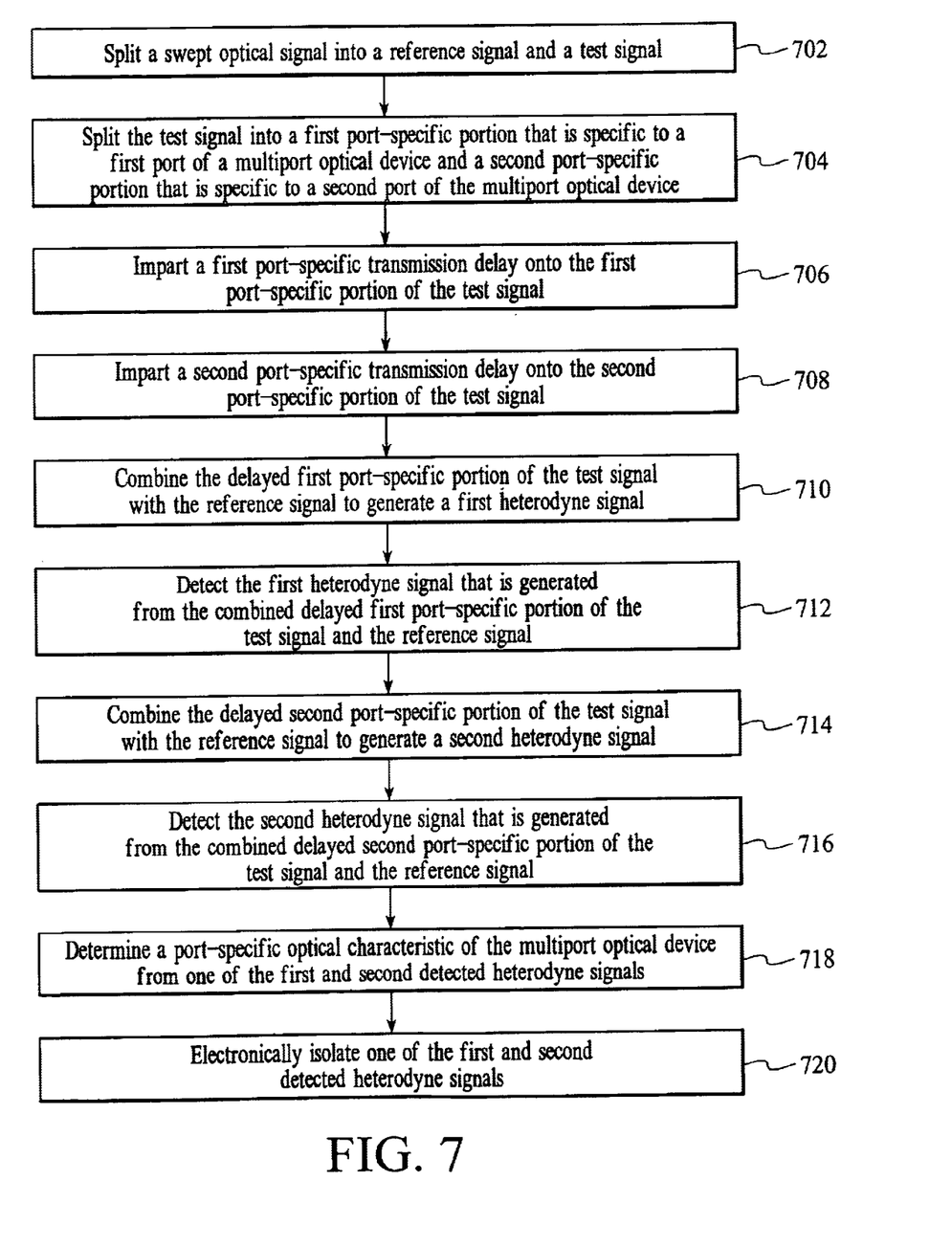
FIG. 7 is a process flow diagram of a method for measuring optical characteristics of a multiport device in accordance with an embodiment of the invention.

A method for measuring optical characteristics of a multiport optical device is depicted in the process flow diagram of FIG. 7. In a step 702, a swept optical signal is split into a reference signal and a test signal. In a step 704, the test signal is split into a first port-specific portion that is specific to a first port of the multiport optical device and a second port-specific portion that is specific to a second port of the multiport optical device. In a step 706, a first port-specific transmission delay is imparted onto the first port-specific portion of the test signal. In a step 708, a second port-specific transmission delay is imparted onto the second port-specific portion of the test signal. In a step 710, the delayed first port-specific portion of the test signal is combined with the reference signal to generate a first heterodyne signal. In a step 712, the first heterodyne signal is detected. In a step 714, the delayed second port-specific portion of the test signal is combined with the reference signal to generate a second heterodyne signal. In a step 716, the second heterodyne signal is detected. In a step 718, a port-specific optical characteristic of the multiport optical device is determined from one of the first and second detected heterodyne signals. In an additional step 720, one of the first and second detected heterodyne signals is electronically isolated.

What is claimed is:

1. A system for measuring optical characteristics of a multiport optical device comprising:

a splitter configured to split a swept optical signal into a reference signal and a test signal;

a test system input, connectable to said multiport optical device, for transmitting said test signal to said multiport optical device;

an optical combiner, optically coupled with said multiport optical device, for receiving, from said multiport optical device, a first portion of said test signal having a first port-specific transmission delay, for receiving a second portion of said test signal having a second port-specific transmission delay, and for combining said first portion of said test signal having said first transmission delay and said second portion of said test signal having said second transmission delay with said reference signal;

a receiver, connected to said optical combiner, for detecting a first heterodyne signal that is generated from said combined first portion of said test signal and said reference signal and for detecting a second heterodyne signal that is generated from said combined second portion of said test signal and said reference signal; and a processor, connected to said receiver, for determining a port-specific optical characteristic of said multiport optical device from one of said first and second heterodyne signals.

2. The system of claim 1 further including port-specific transmission delay units connected to ports of said multiport device.

3. The system of claim 2 wherein each of said port-specific transmission delay units imparts a different transmission delay on an optical signal.

4. The system of claim 2 wherein each of said port-specific transmission delay units are optically connected to said test system input.

5. The system of claim 1 wherein said processor selectively isolates one of said first and second heterodyne signals.

6. The system of claim 5 further including a frequency counter optically connected to receive a portion of said swept optical signal, said frequency counter generating frequency information related to said swept optical signal.

7. The system of claim 6 further including an electrical connection between said frequency counter and said heterodyne receiver for distributing said frequency information to said heterodyne receiver.

8. The system of claim 6 further including an electrical connection between said frequency counter and said processor for distributing said frequency information to said processor.

9. A method for measuring optical characteristics of a multiport optical device, the method comprising steps of:

splitting a swept optical signal into a reference signal and a test signal;

splitting said test signal into a first port-specific portion that is specific to a first port of said multiport optical device and a second port-specific portion that is specific to a second port of said multiport optical device;

imparting a first port-specific transmission delay onto said first port-specific portion of said test signal, said imparting a first port-specific transmission delay resulting in a delayed first port-specific portion of said test signal;

imparting a second port-specific transmission delay onto said second port-specific portion of said test signal, said imparting a second port-specific transmission delay resulting in a delayed second port-specific portion of said test signal;

combining said delayed first port-specific portion of said test signal with said reference signal to generate a first heterodyne signal;

detecting the first optical heterodyne signal;

combining said delayed second port-specific portion of said test signal with said reference signal to generate a second heterodyne signal; and detecting the second optical heterodyne signal; and determining a port-specific optical characteristic of said multiport optical device from one of said first and second detected heterodyne signals.

10. The method of claim 9 further including a step of electronically isolating one of said first and second detected heterodyne signals.

11. The method of claim 9 wherein said first port-specific transmission delay is different from said second port-specific transmission delay.

12. The method of claim 9 further including a step of inputting said test signal into said multiport optical device before said first and second port-specific transmission delays are imparted onto said first and second port-specific portions of said test signal.

13. The method of claim 9 further including a step of inputting said first and second port-specific portions of said test signal into said multiport optical device after said first and second port-specific transmission delays are imparted onto said first and second port-specific portions of said test signal.

14. The method of claim 9 further including a step of tracking the frequency of said swept optical signal to generate frequency information related to said swept optical signal.

15. The method of claim 14 further including steps of:

imparting a reference signal transmission delay onto said reference signal, and utilizing said first port-specific transmission delay, said second port-specific transmission delay, said reference signal transmission delay, and said frequency information to determine optical characteristics of said first and second ports of said multiport optical device.

16. An optical system for testing a multiport optical device having a first port and a second port comprising:

a tunable optical signal source for generating a swept optical signal;

a splitter configured to split said swept optical signal into a reference signal and a test signal;

a first port-specific transmission delay unit, optically connectable to said multiport optical device, for imparting a first port-specific transmission delay onto a first portion of said test signal that is specific to said first port;

a second port-specific transmission delay unit, optically connectable to said multiport optical device, for imparting a second port-specific transmission delay onto a second portion of said test signal that is specific to said second port;

an optical combiner, optically coupled with said multiport optical device, for combining said delayed first portion of said test signal and said delayed second portion of said test signal with said reference signal; and a heterodyne receiver, connected to said optical combiner, for detecting a first heterodyne signal that is generated from said combined delayed first portion of said test signal and said reference signal and for detecting a second heterodyne signal that is generated from said combined delayed second portion of said test signal and said reference signal.

17. The optical system of claim 16 further including a frequency counter optically connected to receive a portion of said swept optical signal from said tunable optical signal source and for generating instantaneous frequency information related to said swept optical signal.

18. The optical system of claim 16 further including a processor, connected to said heterodyne receiver, having filtering circuitry for isolating one of said first and second heterodyne signals.

19. The optical system of claim 16 further including a reference signal transmission delay unit that imparts a known transmission delay onto said reference signal.

20. The optical system of claim 19 further including a frequency counter optically connected to said tunable optical signal source and a processor electrically connected to said heterodyne receiver, said processor using frequency information from said frequency counter and from said first and second heterodyne signals to determine an optical characteristic of said multiport optical device.

* * * * *